US011715375B2

(12) United States Patent
Chen et al.

(10) Patent No.: US 11,715,375 B2
(45) Date of Patent: Aug. 1, 2023

(54) PARKING ASSISTING METHOD, DEVICE AND SYSTEM FOR MOTOR VEHICLE AND MOTOR VEHICLE

(71) Applicant: Bayerische Motoren Werke Aktiengesellschaft, Munich (DE)

(72) Inventors: Wangfeng Chen, Beijing (CN); Haiyang Yang, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/638,583

(22) PCT Filed: Aug. 25, 2020

(86) PCT No.: PCT/EP2020/073761
§ 371 (c)(1),
(2) Date: Feb. 25, 2022

(87) PCT Pub. No.: WO2021/037858
PCT Pub. Date: Mar. 4, 2021

(65) Prior Publication Data
US 2022/0292969 A1    Sep. 15, 2022

(30) Foreign Application Priority Data
Aug. 26, 2019   (CN) .......................... 201910789304.3

(51) Int. Cl.
*G08G 1/14*       (2006.01)
*B60Q 1/48*       (2006.01)
(52) U.S. Cl.
CPC .............. *G08G 1/142* (2013.01); *B60Q 1/488* (2013.01); *B60Q 2400/50* (2013.01)
(58) Field of Classification Search
CPC ..... G08G 1/142; B60Q 1/488; B60Q 2400/50
See application file for complete search history.

(56) References Cited

U.S. PATENT DOCUMENTS 10,583,829  B2 *   3/2020   Kim ..................... B62D 15/028
2008/0129544  A1    6/2008   Augst
(Continued)

FOREIGN PATENT DOCUMENTS

DE      10 2014 204 316 A1      9/2015
DE         102014204316 A1 *    9/2015   ............. B60Q 1/488
(Continued)

OTHER PUBLICATIONS

International Search Report (PCT/ISA/210) issued in PCT Application No. PCT/EP2020/073761 dated Nov. 25, 2020 (five (5) pages).
(Continued)

*Primary Examiner* — Mohamed Barakat
(74) *Attorney, Agent, or Firm* — Crowell & Moring LLP

(57) ABSTRACT

A parking assisting method, device and system for a motor vehicle are provided. The parking assisting method includes the following steps: obtaining a relative position of an available parking spot relative to the motor vehicle; outputting a display instruction to the digital projector according to the relative position of the available parking spot relative to the motor vehicle; and projecting a projection image to the available parking spot by the digital projector according to the display instruction. The projection image is provided for indicating the available parking spot area will be occupied. The display instruction includes an image position for the projection image, so as to change the position of the projection image in the projection range, so that the position of the projection image in the available parking spot is substantially kept unchanged.

15 Claims, 3 Drawing Sheets

(56) References Cited

U.S. PATENT DOCUMENTS

| | | | |
|---|---|---|---|
| 2013/0120572 A1* | 5/2013 | Kwon | B62D 15/0295 |
| | | | 348/148 |
| 2018/0004020 A1* | 1/2018 | Kunii | B60Q 1/0017 |
| 2018/0056858 A1* | 3/2018 | Cunningham, III | G08G 1/168 |
| 2019/0096297 A1 | 3/2019 | Cary et al. | |

FOREIGN PATENT DOCUMENTS

| | | |
|---|---|---|
| DE | 10 2014 011 811 A1 | 2/2016 |
| EP | 1 916 177 A2 | 4/2008 |

OTHER PUBLICATIONS

Written Opinion (PCT/ISA/237) issued in PCT Application No. PCT/EP2020/073761 dated Nov. 25, 2020 (seven (7) pages).

* cited by examiner

PARKING ASSISTING METHOD, DEVICE AND SYSTEM FOR MOTOR VEHICLE AND MOTOR VEHICLE

FIELD OF THE INVENTION

The present disclosure relates to a parking assisting method, a parking assisting device and a parking assisting system for a motor vehicle. The present disclosure also relates to a motor vehicle.

BACKGROUND OF THE INVENTION

When a driver drives a motor vehicle on the road and finds a parking spot on the side of the road, the driver will turn on a reversing light when reversing the parking spot to indicate the direction of parking. At this time, if the driver of a second motor vehicle also wants to park in this parking spot, but he/she does not clearly get the information that the first driver wants to park (for example, he/she fails to see the reversing lights, or it is not clear which parking spot the first motor vehicle will be parked in when there are two parking spots in parallel), the second motor vehicle might be waiting near the parking spot, which may cause a traffic jam in a short time.

For another example, in a parking lot, when the driver of the first motor vehicle chooses one of several adjacent parking spots and is about to park, if nearby pedestrians or other motor vehicle drivers cannot clearly judge to which parking spot the first motor vehicle driver has chosen, then it would be caused that, pedestrians choose the wrong parking spot to avoid or other motor vehicle drivers choose the parking spot that is about to be parked by the first motor vehicle driver. In this case, great inconvenience is brought to other traffic participants in the parking lot.

The parking assisting methods used in the prior art include: voice prompts, reversing lights, and even a fully automatic parking assisting system that does not require driver operation. However, these methods do not significantly improve the aforementioned phenomenon. For pedestrians or other motor vehicles, information can only be obtained from the reversing lights or sounds of the first motor vehicle itself, but they cannot specifically know which parking spot will be parked in. Especially when there are several parallel parking spots, pedestrians may mistakenly avoid because they cannot specifically determine which parking spot the first motor vehicle chooses, or other motor vehicles temporarily park in inappropriate locations because they cannot determine, so that troubles such as traffic jams or wasting parking time can be brought.

In view of this, how to provide a more complete parking assisting method to bring greater convenience to many traffic participants is still a technical problem to be solved by those skilled in the art.

SUMMARY OF THE INVENTION

In view of this, the technical object of the present disclosure is to provide a parking assisting method for a motor vehicle, by which pedestrians and other motor vehicles can accurately and quickly identify occupied parking spots and avoid the occupied parking spots in time, so as to avoid the problems about traffic jams and so on.

In order to achieve the above technical object, the technical solution according to the present disclosure is to provide a parking assisting method for a motor vehicle, wherein the motor vehicle is provided with a digital projector, wherein the digital projector has a projection range, and a projection image can be displayed in this projection range, and wherein the parking assisting method may include the following steps:—obtaining a relative position of an available parking spot relative to the motor vehicle,—outputting a display instruction to the digital projector according to the relative position of the available parking spot relative to the motor vehicle,—projecting the projection image to the available parking spot by the digital projector according to the display instruction, wherein the projection image is provided for indicating the available parking spot area will be occupied, and wherein the display instruction comprises an image position for the projection image.

In this context, preferably, the image position is provided for changing the position of the projection image in the projection range, so that the position of the projection image in the available parking spot is substantially kept unchanged. Here, within the scope of the present disclosure, the "substantially kept unchanged" means that the position of the center of the projection image in the parking spot range of the available parking spot is substantially unchanged, especially relative to the four corner points of the parking spot range, and the angle of any central axis (such as the longitudinal central axis or the transverse central axis) of the projection image relative to any straight line of the parking spot range (especially one of the four sides of the parking spot range) is substantially unchanged.

According to the method of the present disclosure, by utilizing a digital projector to project an image to the parking spot area where the motor vehicle will be parked, other traffic participants, such as pedestrians or other vehicle drivers, can be clearly indicated that the parking spot area will be occupied, thereby other traffic participants can obtain the parking information of the motor vehicle clearly, so as to timely and effectively avoid the problems such as traffic jams and delays in avoiding. Moreover, although the motor vehicle is continuously moving relative to the parking spot during parking, by keeping the position of the projection image in the available parking spot substantially unchanged, it can be ensured that, during the parking process, no matter how the motor vehicle moves, the projection image projected by the projector unit is always displayed at a fixed position in the parking spot. Therefore, it is helpful for other traffic participants to accurately and quickly identify whether the parking spot has been occupied or will be occupied.

Preferably, the display instruction can also comprise the shape and the size of the projection image to adjust the digital projector, so that the shape and the size of the projection image in the available parking spot is substantially kept unchanged. Therefore, it can be ensured that, during parking, no matter how the motor vehicle moves, the projection image projected by the projector unit is always displayed on the fixed position of the parking spot with approximately the same shape and size. Here, within the scope of the present invention, the "substantially kept unchanged" means that the proportion of the projection image in the parking spot range of the available parking spot is substantially unchanged.

Preferably, the digital projector can be used to play a static image and/or a dynamic video. Further preferably, the projection image can be a geometric graph and/or a character. The type of image can be determined according to different motor vehicle brands and categories, or according to the preferences of the driver. This makes the design of motor vehicles more attractive to consumers.

Preferably, the projection area of the projection image can be located within or near the parking spot area, and in particular the projection area can be coincide with the parking spot area. As a result, other traffic participants, such as pedestrians or other vehicle drivers, can be more clearly indicated that the parking spot area will be occupied, so that other traffic participants can obtain the parking information of the motor vehicle more clearly and apparently.

Preferably, the relative position can be the coordinates of parking spot area of the available parking spot relative to the motor vehicle, especially relative to the digital projector.

The technical object of the present disclosure is also to provide a parking assisting system for a motor vehicle, the system can comprise:—a detector with at least one sensor,—a parking assisting device for the motor vehicle, which is configured to obtain a relative position of an available parking spot relative to the motor vehicle from the detector and to output a display instruction to a digital projector according to the relative position of the available parking spot relative to the motor vehicle, and—the digital projector, wherein the digital projector has a projection range, and a projection image can be displayed in this projection range, and wherein the digital projector is configured to project the projection image to the available parking spot according to the display instruction, wherein the projection image is provided for indicating the available parking spot area will be occupied, wherein the display instruction comprises an image position for the projection image. In this context, preferably, the image position is provided for changing the position of the projection image in the projection range, so that the position of the projection image in the available parking spot is substantially kept unchanged.

In addition, the present disclosure adopts a projector unit to realize image projection to the parking spot area, which has a simple structure and is convenient to be combined with other devices to realize the parking assisting function.

According to the third aspect of the present disclosure, a motor vehicle is provided, which can comprise a parking assisting system for a motor vehicle according to the present disclosure.

According to the fourth aspect of the present disclosure, a computer readable storage medium is provided, on which a computer program is stored, wherein the computer program is executed by a processor to implement a method according to the first aspect mentioned previously.

According to the fifth aspect of the present disclosure, an electronic device is provided, which can comprise a memory, a processor and a computer program stored on the memory and operable on the processor, wherein the computer program is executed by the processor to implement a method according to the first aspect mentioned previously.

The parking assisting system for a motor vehicle, the motor vehicle, the computer readable storage medium and the electronic device according to the second to fifth aspects of the present disclosure also correspondingly bring the same advantages as the parking assisting method for a motor vehicle according to the first aspect of the present disclosure, which will be not discussed again.

In brief, through the parking assisting method, device and system for a motor vehicle and the motor vehicle according to the present disclosure, the parking efficiency of the motor vehicle is effectively improved, more convenience is brought to other traffic participants, and the problems such as traffic jams and wasting parking time due to inability to clearly identify parking spots are solved.

In order to make the foregoing objectives, features, and advantages of the present disclosure more comprehensible, specific embodiments of the present disclosure are described in detail below with reference to the accompanying drawings.

DETAILED DESCRIPTION OF THE DRAWINGS

Figure 1:
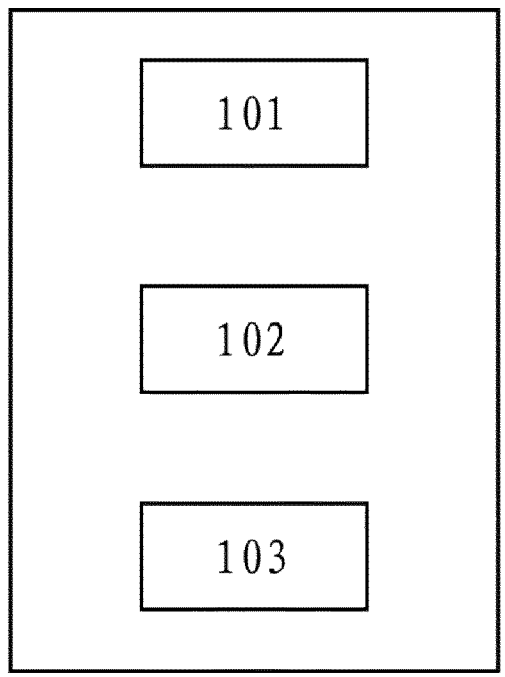
FIG. 1 is a schematic block diagram of an embodiment of a parking assisting system for a motor vehicle according to the disclosure.

FIG. 1 shows a schematic diagram of an embodiment of a parking assisting system 100 for a motor vehicle according to the present disclosure. In this embodiment, the parking assisting system 100 can comprise a detector 101, a parking assisting device 102 for the motor vehicle, and a digital projector 103.

The detector 101 can comprise at least one sensor, such as a camera, a radar, etc., and can detect a relative position of an available parking spot, i.e. the parking spot to be parked by the motor vehicle, relative to the motor vehicle. In particular, the relative position can be the coordinates of parking spot area of the available parking spot relative to the motor vehicle, especially the digital projector.

The parking assisting device 102 for the motor vehicle can be configured to obtain a relative position of an available parking spot relative to the motor vehicle from the detector 101 and to output a display instruction to a digital projector 103 according to the relative position of the available parking spot relative to the motor vehicle.

The projector 103 can receive the display instruction from the parking assisting device 102 for the motor vehicle and project the projection image to the available parking spot according to the display instruction, wherein the projection image is provided for indicating the available parking spot area will be occupied. The projector 103 can especially be arranged at the rear of the motor vehicle. It is also possible to arrange multiple projectors according to actual conditions, which are distributed in different positions in the motor vehicle.

The projection image may be, for example, a graph and/or a number and/or a character. The digital projector can be used to play static images and/or dynamic videos. The digital projector may use, for example, a video player, which keeps the projection image displayed in the available parking spot continuously changing, thereby facilitating passing pedestrians and other motorized and non-motorized vehicles to notice that, a vehicle is parking, so please keep your distance, keep away for safety, and so on.

Figure 3A:
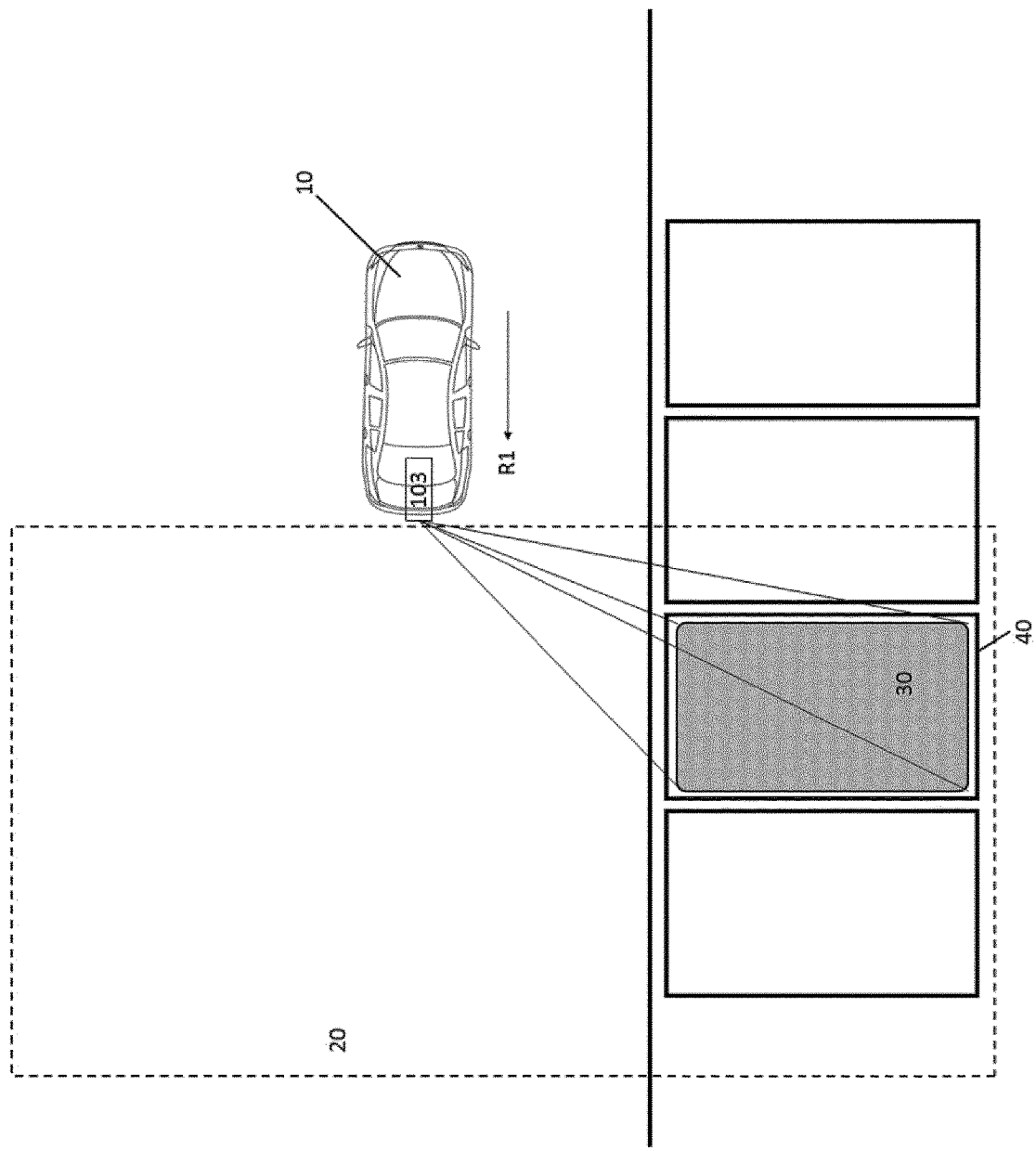
FIGS. 3A and 3B are schematic diagrams of an embodiment in which a motor vehicle with the parking assisting system according to the disclosure is implementing the parking assisting method according to the disclosure.
Figure 3B:
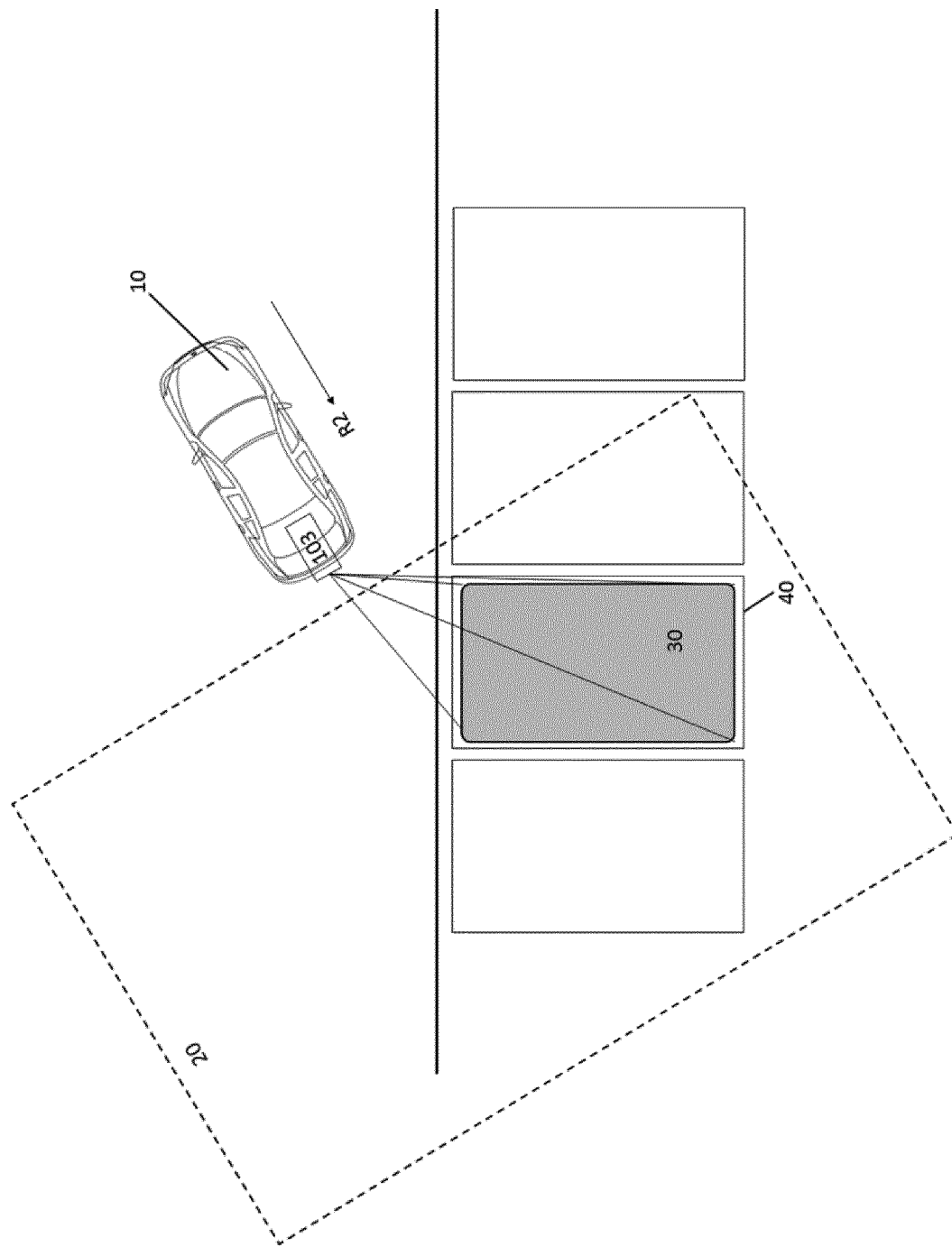

As shown in FIGS. 3A and 3B, the digital projector 103 is stationary relative to the motor vehicle 10, and the digital projector has a projection range 20 in which a projection image 30 can be displayed.

As the motor vehicle 10 moves, the position of the projection range 20 of the digital projector 103 changes accordingly. In order to keep the position of the projection image 30 in the available parking spot 40 substantially unchanged, according to the present disclosure, the display instruction includes an image position for the projection image 30, so as to change the position of the projection image 30 in the projection range 20, which makes the position of the projection image in the available parking spot 40 substantially remain unchanged.

In an advantageous embodiment, the display instruction may further include: the shape and size of the projection image 30 for adjusting the digital projector 103, so that the shape and size of the projection image 30 in the available parking spot 40 remain substantially unchanged.

In addition, the parking assisting system 100 may further include a selection device (not shown), which can be configured to choose at least one image from the images stored in the digital projector 103 as the projection image.

In this context, the digital projector 103 may include an image display (not shown), which may store at least one image. The user of the motor vehicle can directly choose at least one image as the projection image on the image display.

Figure 2:
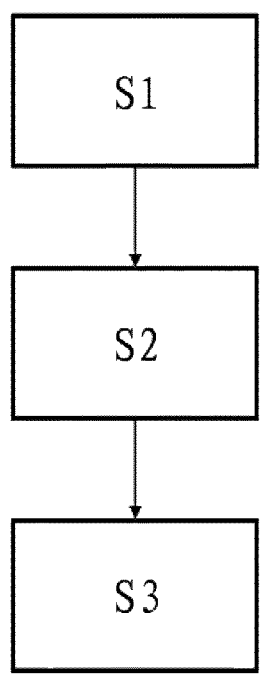
FIG. 2 is a flowchart of an embodiment of a parking assisting method for a motor vehicle according to the disclosure.

FIG. 2 shows a schematic flowchart of a parking assisting method for a motor vehicle according to the present disclosure. FIGS. 3A and 3B exemplarily show a scenario where the motor vehicle 10 finds out an available parking spot 40 and intends to park in the available parking spot 40. Hereinafter, the working mode of the parking assisting device for the motor vehicle according to the present disclosure will be described in detail with reference to the example of FIGS. 3A and 3B.

In step S1, the relative position of the available parking spot 40 with respect to the motor vehicle 10 is obtained. The relative position may be the parking spot area coordinates of the available parking spot 40 relative to the motor vehicle 10, especially the digital projector 103.

In step S2, a display instruction is output to the digital projector 103 according to the relative position of the available parking spot 40 relative to the motor vehicle 10.

According to the present disclosure, the display instruction includes an image position for the projection image 30, so as to change the position of the projection image 30 in the projection range 20, so that the position of the projection image in the available parking spot 40 remains substantially unchanged.

In a preferred embodiment, the display instruction may further include: the shape and size of the projection image 30 for adjusting the digital projector 103, so that the shape and size of the projection image 30 is in the available parking spot 40 and remains substantially unchanged.

In this way, it can be ensured that, during the parking process, no matter how the motor vehicle moves, the projection image projected by the projector is always displayed on the fixed position of the parking spot in approximately the same shape and size.

In step S3, according to the display instruction, the digital projector 103 projects a projection image 30 to the available parking spot 40, and the projection image is used to indicate that the available parking spot area will be occupied. The projection image may be a graph and/or a number and/or a character, and/or the projection image may be a still image and/or a dynamic image. As a result, pedestrians and other motor vehicles near the parking spot can learn that the parking spot is already occupied or that a vehicle is parking to this parking spot.

In this embodiment, the projection area where the projection image 30 is located is a rectangular graphic, which occupies almost the entire parking spot area where the available parking spot 40 is located. Preferably, the projection area of the projection image 30 can be located within or near the parking spot area where the available parking spot 40 is located (as shown in FIGS. 3A and 3B). In particular, the projection area may coincide with the parking spot area. As a result, pedestrians and other motor vehicles near the parking spot can understand more clearly and apparently that the parking spot has been occupied or that a vehicle is parking to this parking spot.

The parking assisting method, device and system according to the present disclosure are not only suitable for parking spots on the side of the road, but also for parking side-by-side in a parking lot, especially where there are multiple adjacent parking spots. In the latter case, through the parking assisting method, device and system according to the present disclosure, other traffic participants can clearly learn which parking spot the motor vehicle specifically chooses to park in.

The principles and implementations of the present disclosure have been described above through specific examples, but these specific examples are only for explanation and do not limit the protection scope of the present disclosure. It should be pointed out that, for those skilled in the art, without departing from the principle of the present disclosure, any improvement and modification of the present disclosure shall fall within the protection scope of the claims of the present disclosure.

The invention claimed is:

1. A parking assisting method for a motor vehicle equipped with a digital projector, wherein the digital projector has a projection range in which a projection image is displayable in the projection range, the parking assisting method comprising:
    obtaining a relative position of an available parking spot relative to the motor vehicle;
    outputting a display instruction to the digital projector according to the relative position of the available parking spot relative to the motor vehicle; and
    projecting the projection image to the available parking spot by the digital projector according to the display instruction,
    wherein the projection image is provided for indicating the available parking spot area is intended to be occupied,
    wherein the display instruction comprises an image position for the projection image, and
    wherein the image position is provided to make the digital projector change the position of the projection image in the projection range during a parking process, so that the position of the projection image in the available parking spot is kept unchanged during the parking process.

2. The parking assisting method according to claim 1, wherein
    the display instruction further comprises a shape and a size of the projection image to make the digital projector adjust the projection image, so that the shape and the size of the projection image in the available parking spot is kept unchanged during the parking process.

3. The parking assisting method according to claim 1, wherein
    the digital projector is configured to play a static image and/or a dynamic video.

4. The parking assisting method according to claim 1, wherein
    the projection image is a geometric graph and/or a character.

5. The parking assisting method according to claim 1, wherein the relative position comprises coordinates of a parking spot area of the available parking spot relative to the motor vehicle.

6. The parking assisting method according to claim 1, wherein
the relative position comprises coordinates of a parking spot area of the available parking spot relative to the digital projector.

7. A computer product comprising a non-transitory computer readable storage medium, on which a computer program is stored, wherein the computer program is executed by a processor to implement the method according to claim 1.

8. An electronic device comprising a non-transitory memory, a processor and a computer program stored on the memory and operable on the processor, wherein the computer program is executed by the processor to implement the method according to claim 1.

9. A parking assisting system for a motor vehicle, the system comprising:
a detector with at least one sensor;
a digital projector; and
a parking assisting device for the motor vehicle, which is configured to obtain a relative position of an available parking spot relative to the motor vehicle from the detector and to output a display instruction to the digital projector according to the relative position of the available parking spot relative to the motor vehicle,
wherein the digital projector has a projection range, and a projection image is displayable in said projection range,
wherein the digital projector is configured to project the projection image to the available parking spot according to the display instruction,
wherein the projection image is provided for indicating the available parking spot area is intended to be occupied,
wherein the display instruction comprises an image position for the projection image, and
the image position is provided to make the digital projector change the position of the projection image in the projection range during a parking process, so that the position of the projection image in the available parking spot is kept unchanged during the parking process.

10. The parking assisting system according to claim 9, wherein
the display instruction further comprises a shape and a size of the projection image to make the digital projector adjust the projection image, so that the shape and the size of the projection image in the available parking spot is kept unchanged during the parking process.

11. The parking assisting system according to claim 9, wherein
the digital projector is configured to play a static image and/or a dynamic video.

12. The parking assisting system according to claim 9, wherein
the projection image is a geometric graph and/or a character.

13. The parking assisting system according to claim 9, wherein
the relative position comprises coordinates of a parking spot area of the available parking spot relative to the motor vehicle.

14. The parking assisting system according to claim 9, wherein
the relative position comprises coordinates of a parking spot area of the available parking spot relative to the digital projector.

15. A motor vehicle comprising a parking assisting system for the motor vehicle according to claim 9.

* * * * *